United States Patent [19]
Pearce

[11] 3,896,947
[45] July 29, 1975

[54] SPREADING AND END SPILL DUMP TRAILER

[76] Inventor: Arthur W. Pearce, 275 Lk. Desire Dr. North, Renton, Wash. 98055

[22] Filed: Nov. 23, 1973

[21] Appl. No.: 418,268

Related U.S. Application Data

[62] Division of Ser. No. 275,058, July 25, 1972, Pat. No. 3,847,405.

[52] U.S. Cl. .......... 214/82; 222/517; 239/676; 280/81 R; 296/56
[51] Int. Cl.² .......................................... B60P 1/00
[58] Field of Search ...... 214/82; 222/491, 444, 517, 222/556; 239/676 X; 298/23 R, 23 D, 23 DF; 296/56; 280/81 R

[56] References Cited
UNITED STATES PATENTS

| | | | |
|---|---|---|---|
| 2,530,350 | 11/1950 | Ehlert | 214/82 |
| 2,908,529 | 10/1959 | Davidson | 296/56 |
| 3,209,850 | 10/1965 | Fish | 280/81 R |
| 3,231,146 | 1/1966 | Troy | 222/491 X |
| 3,247,985 | 4/1966 | Scardoni | 214/82 |
| 3,544,154 | 12/1970 | Ford | 296/56 |
| 3,685,853 | 8/1972 | Goldsmith | 280/81 R |
| 3,790,035 | 2/1974 | Ryan | 222/517 X |

*Primary Examiner*—Robert J. Spar
*Assistant Examiner*—Leslie J. Paperner
*Attorney, Agent, or Firm*—Berman, Bishoff & Platt

[57] ABSTRACT

A trailer vehicle is described for transporting on highways, within legal load limits, bulk material, such as aggregate and the like, and for spreading or dumping the material as desired. The vehicle incorporates an hydraulically actuated rejection gate for forcing the material from the tailgate, a sliding frame for the rear bogies of the trailer for extending the trailer when it is used for highway hauling, an hydraulically telescoping reach from the trailer to the tractor to permit the trailer to be a tracking vehicle and a fifth wheel mechanism which allows the trailer to track independently from the main trailer frame.

3 Claims, 13 Drawing Figures

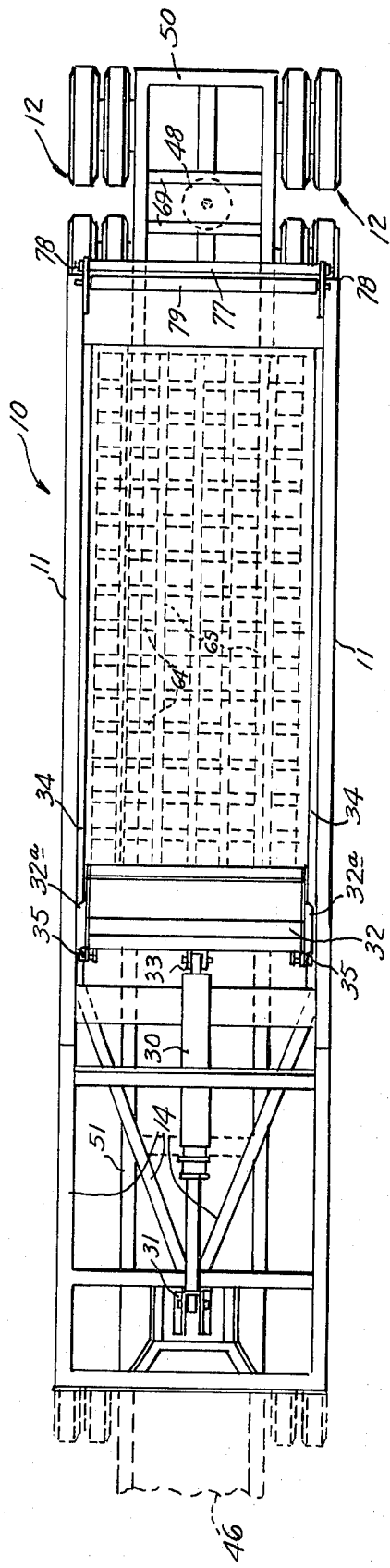

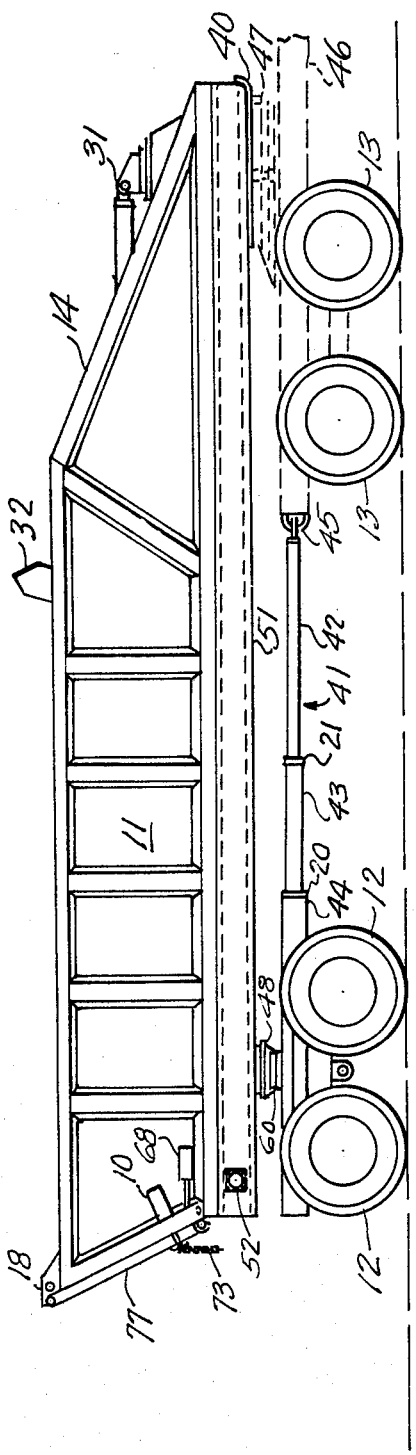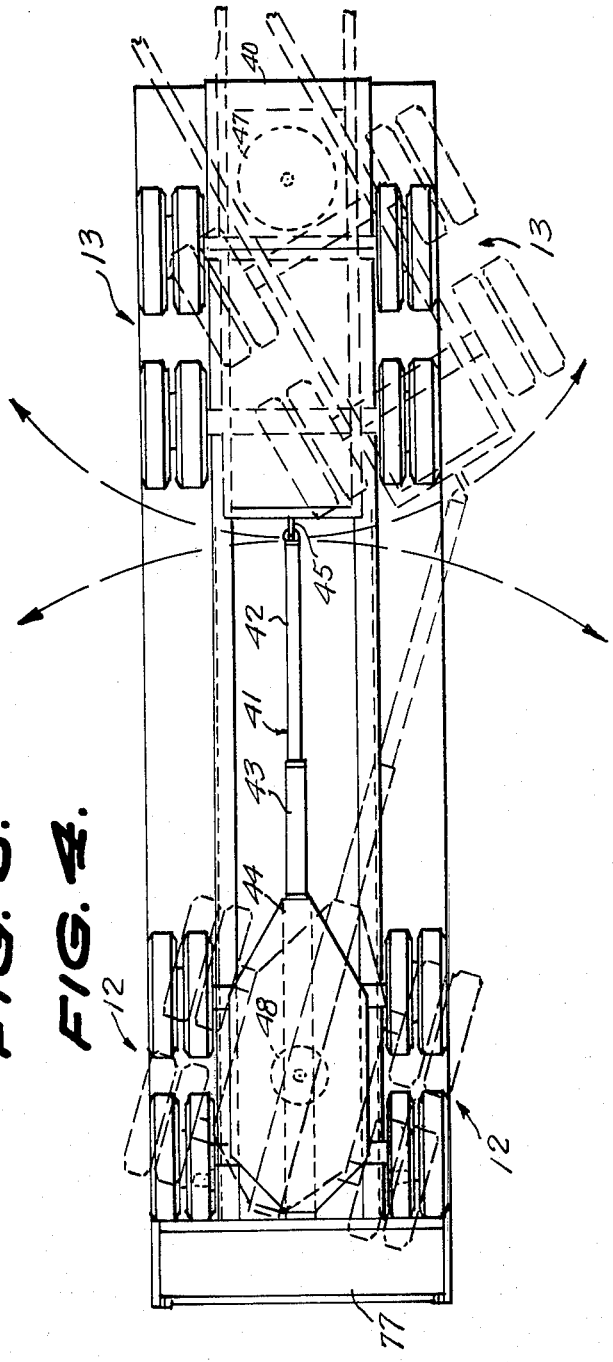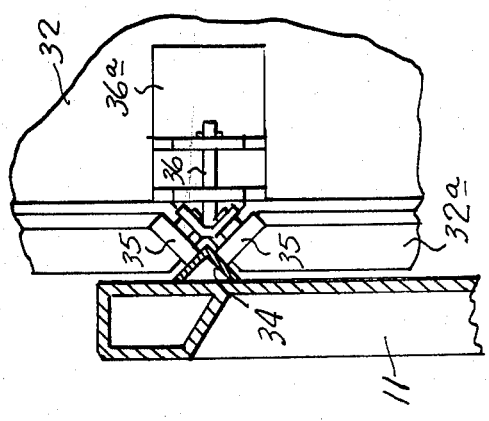

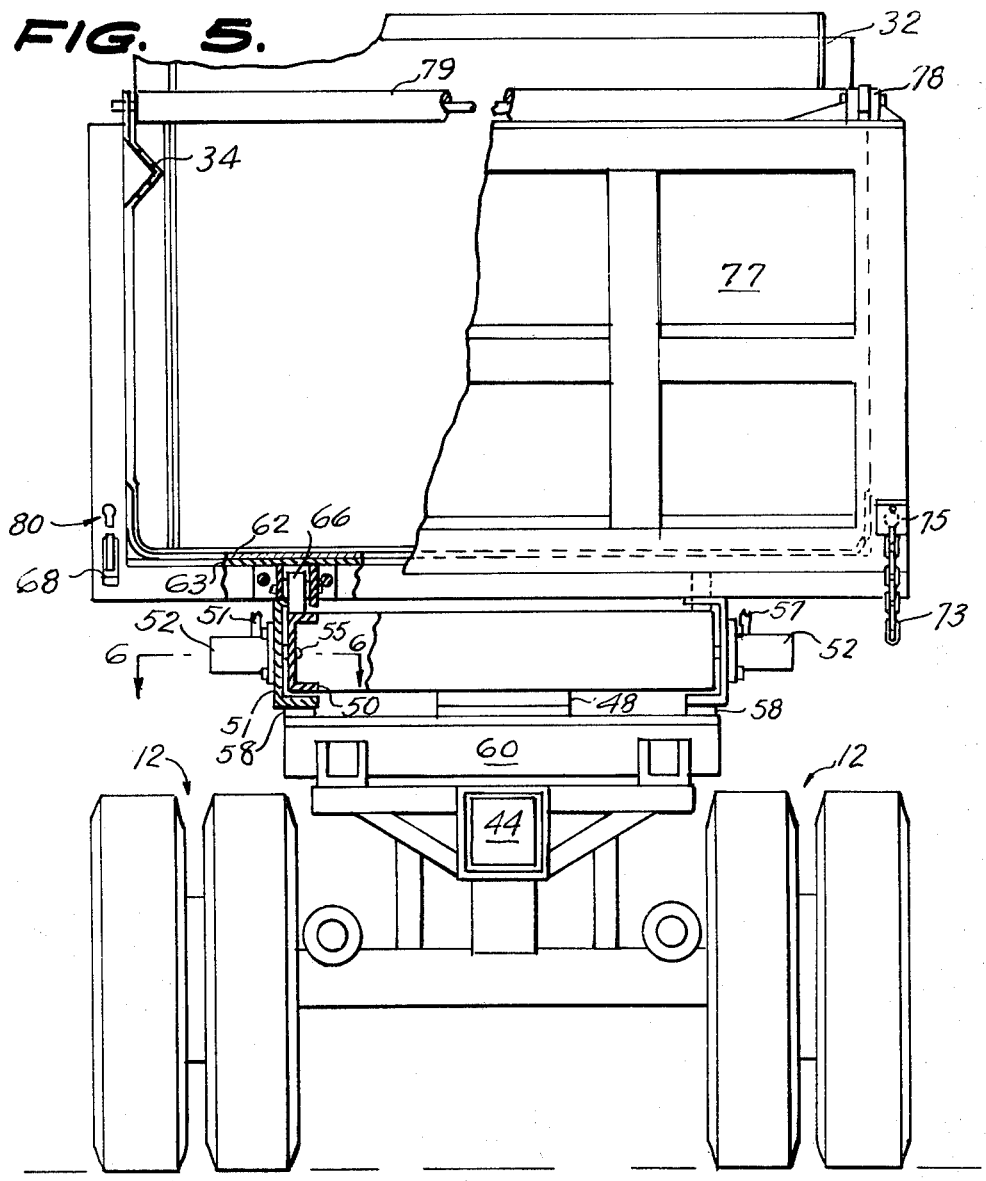
FIG. 5.
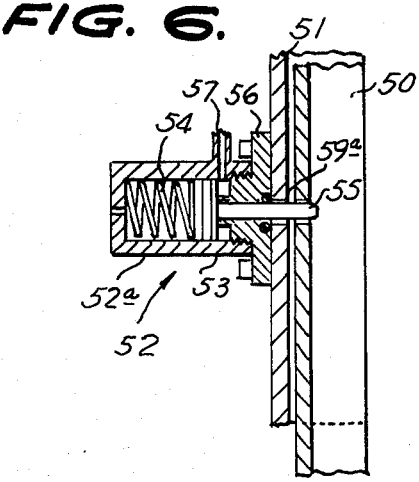
FIG. 6.
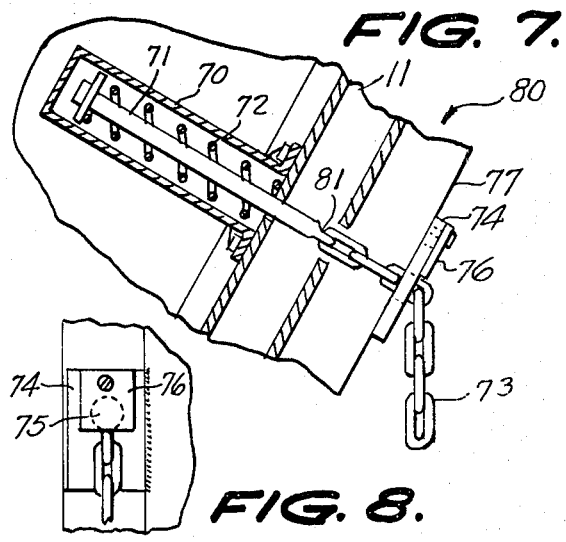
FIG. 7.
FIG. 8.

SPREADING AND END SPILL DUMP TRAILER

This is a division of application Ser. No. 275,058, filed July 25, 1972, now U.S. Pat. No. 3,847,405.

FIELD OF THE INVENTION

This invention relates to vehicles and more particularly relates to a trailer which may be pulled by a tractor, for highway transport of loads of bulk material such as dirt, aggregate, sand, mud, rock, asphalt, ores, broken concrete and other debris and for dumping the material by means of an hydraulically actuated ram and rejection gate.

BACKGROUND OF THE INVENTION

At the present time, the only known highway aggregate hauling vehicles are of the standard dump truck type or belly-dump trailer type. These known types of vehicles suffer from a number of severe disadvantages. For example, the standard dump truck type of vehicle is inherently dangerous because of the possibility of tip-over or tip-back when the body of the truck is raised. Similarly, the raised dump boxes of such vehicles often damage overhead structures and communication lines and create the danger of electrocution of the operator by coming in contact with overhead power lines. Further, this type of vehicle is limited in its ability to discharge loads as a direct function of the degree of slope that the truck tractor can safely travel over.

In the case of belly-dump trailers, other severe disadvantages are inherent. For example, these vehicles are limited as to the size and type of aggregate which they can handle, and are incapable of hauling oversized rock, broken concrete and debris. In addition, such vehicles are incapable of charging spreading machines and are not adaptable to the discharge of material over fill banks. Moreover, these vehicles are not suitable to the stockpiling of mud or other wet materials and oftentimes cause damage to their rear bogie and brake assemblies due to the manner in which the load is discharged.

Another commonly used aggregate hauling vehicle is known as a "train" and consists of a towing tractor and two independent belly-dump trailers. While this vehicle combination has an increased capacity and somewhat more flexibility than those vehicles described above, it nevertheless suffers from most of the disadvantages of dump trucks and belly-dump trailers, and additionally, suffers from the disadvantage of decreased maneuverability. This type of vehicle cannot be reversed for even the shortest distance, without jackknifing, thus making it impossible to turn the vehicle around in a congested area.

Another combined vehicle which has been in use, is the dump truck and dump trailer combination. However, while this combination has some advantages over those described above, particularly with respect to the load capacity, it is extremely cumbersome to operate. For example, two separate loading operations are required. In addition, in order to discharge the load from both the truck and trailer, it is necessary for the driver to first discharge the trailer load, then pull the combined vehicles ahead for a substantial distance, secure the brakes on the trailer, uncouple the hitch, screw down the hitch support jack, uncouple the hydraulic lines for the trailer dumping mechanism, unfasten the safety chain, disconnect the lines for the trailer brakes and light wiring and then back the truck into position to discharge its load into the spreading machine. After this has been accomplished, the procedure must be reversed to reattach the trailer.

SUMMARY OF THE INVENTION

Broadly, it is an object of the present invention to overcome the above-described deficiencies in the presently used highway vehicles for transporting aggregate and similar materials. Accordingly, the present invention incorporates in combination the following main features:

1. A sliding frame for the rear trailer bogies which permits the frame to be telescopically extended for highway hauling in accordance with legal load limits and telescopically retracted for ejection of the transported materials;

2. An hydraulically actuated ram and rejection gate which can selectively eject the material from the rear of the trailer through an opening provided by a raised tailgate;

3. A pneumatically operated tailgate regulation flow device which regulates the opening of the tailgate for the purpose of controlling the spreading of material and which incorporates a tension spring device to allow the escape of oversized material without damage to the tailgate;

4. A telescopically extendible reach which connects the trailer to the tractor and permits the trailer to be a tracking-type vehicle; and 5. A fifth wheel mechanism which allows the trailer to track independently of the main trailer frame.

The above-described main features of the invention, in conjunction with subsidiary features, which will be more fully described below, combine to eliminate the problems in the prior art vehicles of this general class and to provide an efficient, compact and easily maneuverable vehicle. When the vehicle is in its extended position, the wheel base and load distribution will permit the hauling of maximum legal loads on highways and when in its retracted position, will allow end spill discharge of the material into spreading machines, hoppers and over embankments. Through the use of the hydraulically actuated rejection gate, complete discharge of the load is assured, thus eliminating the hazardous practice of jerking raised truck bodies back and forth to discharge the material. In addition, manual cleaning of material remaining in the load box is eliminated, since the rejection gate cleanly discharges all material.

The present invention, incorporating the hydraulically controlled rejection gate, affords the driver of the vehicle the advantage of being in complete control of the quantity of material discharged at any one location. This is of considerable importance, since it is often desirable to partially discharge a load of aggregate at a number of different locations. No other presently existing highway vehicle, utilized for aggregate hauling purposes, can accomplish this as efficiently or safely.

By using the fifth wheel mechanism in the trailer, the vehicle may be worked in areas heretofore inaccessible to long trailers. The use of this mechanism also provides a shorter turning radius and imparts to the vehicle the ability to spread material alongside curbs, in cul de sacs and along crooked mountain roads.

These and other objects, features and advantages of the present invention will be more readily appreciated from a consideration of the detailed description set

BRIEF DESCRIPTION OF THE DRAWINGS

FIG. 1 is a top plan view of the trailer of the present invention with the rear bogies in extended position;

FIG. 2 is a side elevational view of the trailer of the present invention with the bogies in extended position;

FIG. 3 is a side elevational view of the trailer of the present invention with the rear bogies in the retracted position;

FIG. 4 is a bottom plan view of the trailer of the present invention with the articulated tracking of the trailer being illustrated in dotted line position;

FIG. 5 is a rear elevational view, partly broken away and partly in section, of the trailer of the present invention, showing in detail the interrelation between the sliding and fixed frame members for the rear bogies and the locking device therefor;

FIG. 6 is a partial sectional view taken on the line 6—6 in FIG. 5, looking in the direction of the arrows, illustrating the details of the locking device for the sliding frame member for the rear bogies;

FIG. 7 is an enlarged cross-sectional detail of the tailgate regulation flow device of the present invention;

FIG. 8 is a side elevational view of the tailgate regulation flow device illustrated in FIG. 7, looking from the right in that figure;

FIG. 13 is a sectional view taken on the line 13—13 in FIG. 12, looking in the direction of the arrows, and illustrating the details of the upper mounting of the rejection gate.

DETAILED DESCRIPTION OF THE INVENTION

Figure 9:
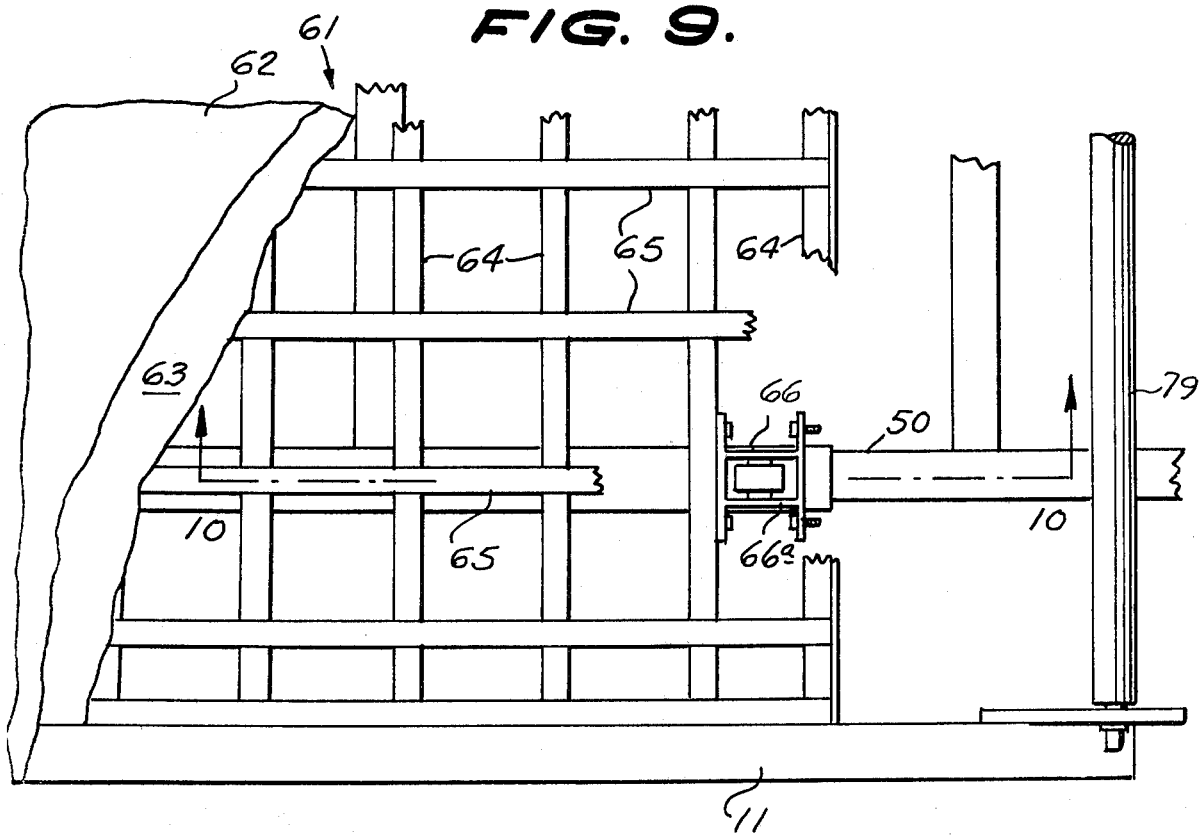
FIG. 9 is a partial, broken away view of the structural framework of the trailer of the present invention, illustrating in detail the floor design.

Referring now to the drawings, wherein like reference numerals designate like parts throughout the several views thereof, there is shown the trailer of the present invention generally designated by the reference numeral 10. With particular reference now to FIGS. 1 and 2, the trailer 10 is shown in its extended position such as it would be when hauling material on highways, in order to comply with the legal load limit.

As shown in FIGS. 1 and 2, trailer 10 comprises main load bearing frame member 51, formed of structural steel or aluminum alloy or the like, inside of which is slidably mounted sliding frame member 50 for the rear bogies 12. The box of the trailer, which is mounted on load bearing member 51, comprises side panels 11, rejection gate 32 and tailgate 77.

At the front of the trailer structure, which is supported by structural members 14, is superstructure 31, which contains the oil reservoir and control valve for actuating threestage, double-acting hydraulic powered cylinder 30 which is connected to rejection gate 32 at fitting 33. Oil reservoir, control valve and connections therefor are standard components, readily available and hence are not illustrated in detail.

Rejection gate 32 is mounted at its upper end on angle irons 34 which are welded or otherwise attached to the inner sides 11 of the trailer, by bearings 35, as will be more fully explained below in connection with FIGS. 11 and 12. Rejection gate 32 is provided with scraping edge 32a to assure that all material will be transported rearwardly toward tailgate 77 when hydraulic powered cylinder 30 is actuated.

Tailgate 77 is suspended by hinges 78 from the upper end portions of trailer sides 11 and extends inwardly at approximately a 45° angle with the vertical. The purpose of this angular mounting of the tailgate is to increase the capacity of the trailer box while at the same time reducing the overall movement of rejection gate 32. In addition, the angular mounting of the tailgate serves the purpose of increasing the opening thereof to accommodate larger size material such as rocks, stumps and the like. The tailgate is provided with a regulation flow device 80, comprising tubular housing 70 welded to side 11 of the trailer box and adjustment chain 73. This tailgate regulation flow device will be described more fully hereinbelow in connection with FIGS. 7 and 8. Spacer 79 is mounted forwardly of tailgate 77 in order to retain the shape of the trailer box and to absorb any shock which may be imparted thereto by rejection gate 32.

Rear bogies 12 are conventionally mounted on a rear axle assembly which in turn is structurally connected to rear section 44 of three-stage telescoping steering stringer 41 having three rectangular cross-sectional tubular sections 42, 43 and 44. Self-lubricating metal bushings 20 and 21 are provided between sections 43 and 44 and sections 42 and 43, respectively, so that these sections may easily telescope into one another and out from one another to permit tracking of the trailer, as will be more fully explained below. Welded or otherwise attached to the forward end of stringer section 42 is hitch 45 for attachment to tractor 46 (shown in dotted lines) having fifth wheel 47 for attachment to fifth wheel pin 49 mounted on plate 40 at the front end of trailer 10. It should be noted that steering stringer 41 performs no function in pulling the trailer but acts only as the trailer steering mechanism. Rather, the operative pulling attachment is at pin 49 and fifth wheel 47 of the tractor. Bogie assembly 13 of tractor 46 is illustrated to show the difference in wheel spacing when sliding frame 50 is retracted within main frame 51.

Trailer 10 contains a fifth wheel mounting 48, disposed between cross member 60 on rear section 44 of steering stringer and cross members 69 on sliding frame member 50. This fifth wheel attachment 48 operates in conjunction with steering stringer 41 to enable the trailer to readily maneuver in tight spaces, as will be shown below.

Main frame member 51 is provided with a pneumatically actuated locking device 52 which engages with hole 59 in sliding frame member 50, as will be more fully explained in connection with FIG. 6 hereinbelow. A similar locking device 68 is also provided for tailgate 77 and comprises a bell crank lock powered by air controlled rams powered by the tractor's air supply and controlled from the tractor.

Referring now to FIG. 3, the trailer of the present invention is illustrated in position for effecting the dumping operation. In order to achieve this position, standard brakes on the rear axles of bogies 12 are set and locking device 52 (which will be presently described) is actuated from the tractor so that sliding frame member 50 will be free to slide into main frame member 51. The tractor is then backed up with steering stringer 41 telescoping to the position shown in FIG. 3 and sliding frame member 50 telescoping into main frame member 51 until hole 59 is in alignment with locking device 52. Locking device 52 will then be actuated from the tractor, locking frame members 50 and 51 in the position shown in FIG. 3, and the trailer will be ready for dumping since the space below tailgate 77 is clear.

Reference is now made to FIG. 6 for an explanation of the operation of locking device 52. The pneumatically controlled pin locking device 52 comprises an outer cylindrical housing 52a threadedly engaged with adapter 56 which is bolted or otherwise fixedly secured to main frame 51. Disposed within housing 52a is air ram 53 joined to locking pin 55 which extends through aligned orifices 59a in frames 51 and 50. Normally urging air ram 53 and locking pin 55 into the locked position, as shown in FIG. 6, is spring 54. Air inlet 57 is in communication with an air line connected to the pneumatic air supply of the tractor and controlled from the cab of the tractor in a conventional manner. Thus, when it is desired to release locking device 52, air is forced through air inlet 57 into the space between air ram 53 and adapter plate 56 which causes air ram 53 and pin 55 to be retracted against the force of spring 54. When it is desired to once again lock the device, the air supply is released. It will be appreciated, as shown in FIG. 5, that a locking device 52 is disposed at each side of frame 51.

Referring now to FIG. 4, it will be seen how the telescoping steering stringer 41 in combination with fifth wheel mechanism 48, permit the trailer to be steered. As shown therein, when tractor 46 is pulling the trailer in the substantially straight direction, steering stringer 41 is compressed, as shown in the full line position. However, when a sharp turn is to be made, or when it is desired, for example, to back the trailer into position in a narrow or congested area, the tractor can turn to the position shown in dotted lines, and maneuver the trailer into the desired position, as shown in dotted lines, by virtue of fifth wheel mounting 48 and steering stringer 41 which, as can be seen, is now extended from its original position. Self-lubricating metal bushings 20 and 21, readily permit the sections of steering stringer 41 to telescope in and out of each other.

In FIGS. 7 and 8, there are illustrated the details of tailgate regulation flow device 80. It will be seen in FIG. 5, that one of these devices is mounted at each end of tailgate 77. The device 80 comprises a cylindrical spring housing 70 bolted or otherwise permanently secured to each side 11 of the trailer box, as shown in FIGS. 2 and 3. Disposed within housing 70 is tension bolt and washer assembly 71, coaxially arranged with respect to tension spring 72. Passing through ring 81 at one end of tension bolt 71 is adjustment chain 73 which also passes through keyhole slot 75 in bracket 74 which is mounted on tailgate 77. Pivotally mounted on the upper portion of bracket 74 is lock plate 76.

In operation, when it is desired to regulate the opening of tailgate 77 for the purpose of controlling spreading of material or to allow the escape of oversize material to curtail damage to the tailgate, chains 73 are pulled down a distance sufficient to impart the desired degree of tension to spring 72. The chains are then pulled into engagement with the lower portion of keyhole members 75 and lock plates 76 are swung into the closed position, as shown in FIG. 8, to prevent the tension from becoming relaxed by virtue of chains 73 escaping through the upper portion of keyhole 75. It can be seen that by virtue of the adjustment of chains 73, tailgate 77 may open a distance equal to the travel of tension bolt and washer assembly 71 to the bottom of housing 70.

Figure 10:
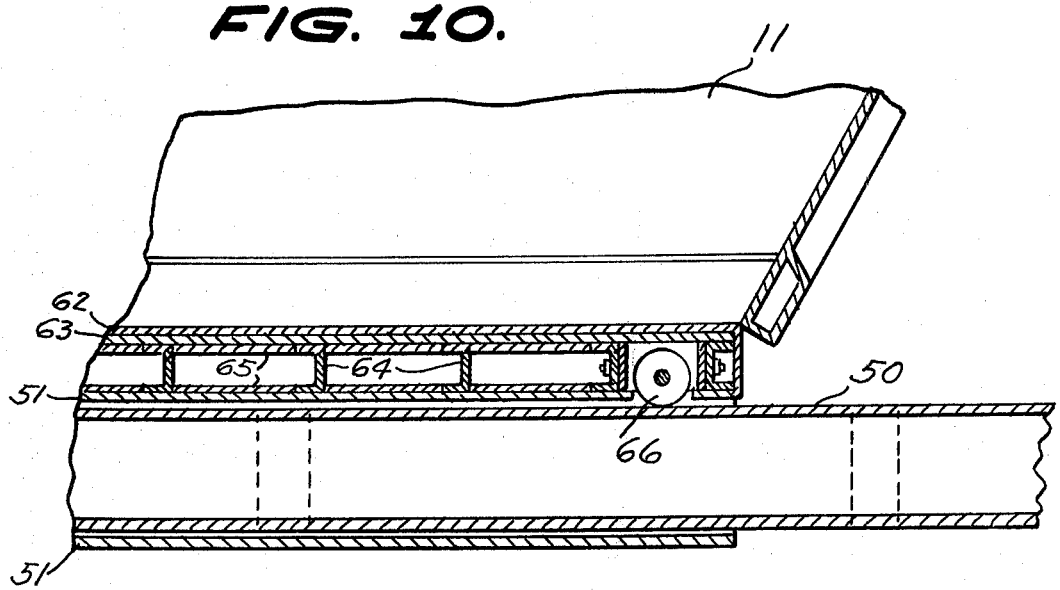
FIG. 10 is a partial sectional view taken on the line 10—10 in FIG. 9, looking in the direction of the arrows.

In order to overcome the problem of uneven flow and hang-up of material which is caused by the conventional floor structure in hauling vehicles now in use, the trailer of the present invention incorporates a specially designed floor. As can be seen in FIGS. 9 and 10, the floor structure of the trailer of the present invention, generally designated by reference numeral 61, comprises a top plate of high tensile steel 62, adhesively bonded to plate 63 of aluminum alloy. The combined plate structure is supported by a gridwork of transverse aluminum channels 64 notched to receive longitudinal aluminum channels 65. The resulting gridwork is welded to the upper part of main frame member 51. The resulting structure provides support to the floor area in sufficient proportion to insure a smooth bottom and prevent sag for an extended length of time.

Referring to FIGS. 5, 9 and 10, it can be seen that roller 66, mounted within housing 66a on two of the transverse aluminum channels 64, provides a means whereby slidable frame member 50 may easily roll into and out of main frame member 51. A similar roller and housing would be provided on both sides of frame member 50. It should be realized, however, that rollers 66 are not entirely necessary. In place thereof, self-lubricating wear strips may be used. As seen in FIG. 5, rub plates 58 are inserted between main frame members 51 and structural cross frame member 60. If desired, weighing scales may be incorporated at these points.

Figure 11:
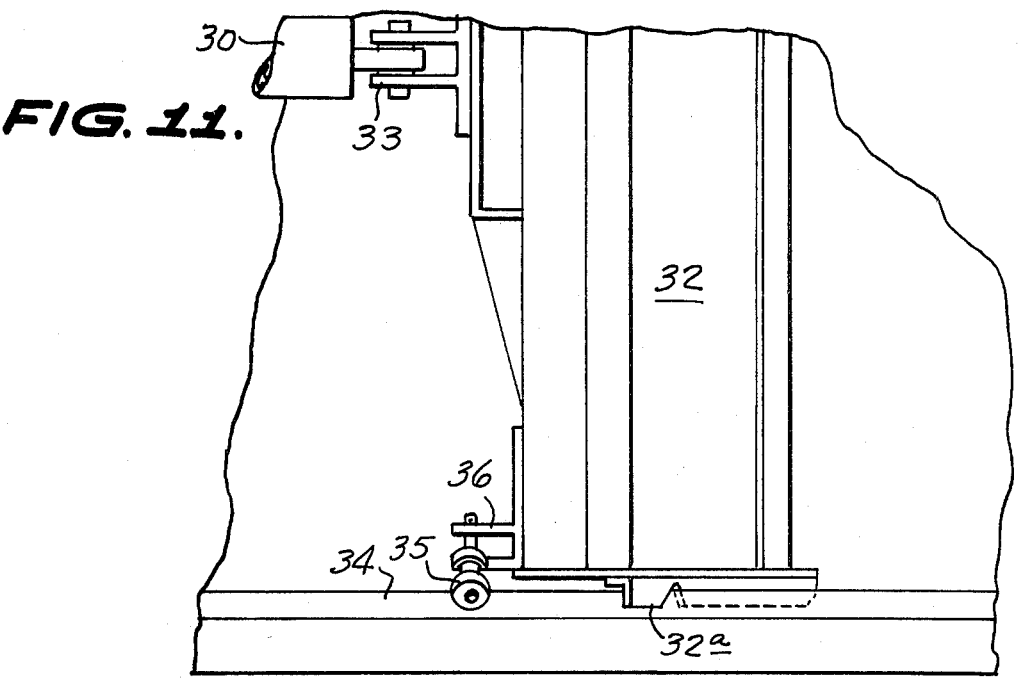
FIG. 11 is a partial broken away top plan view, showing in detail the mounting of the rejection gate on the trailer.
Figure 12:
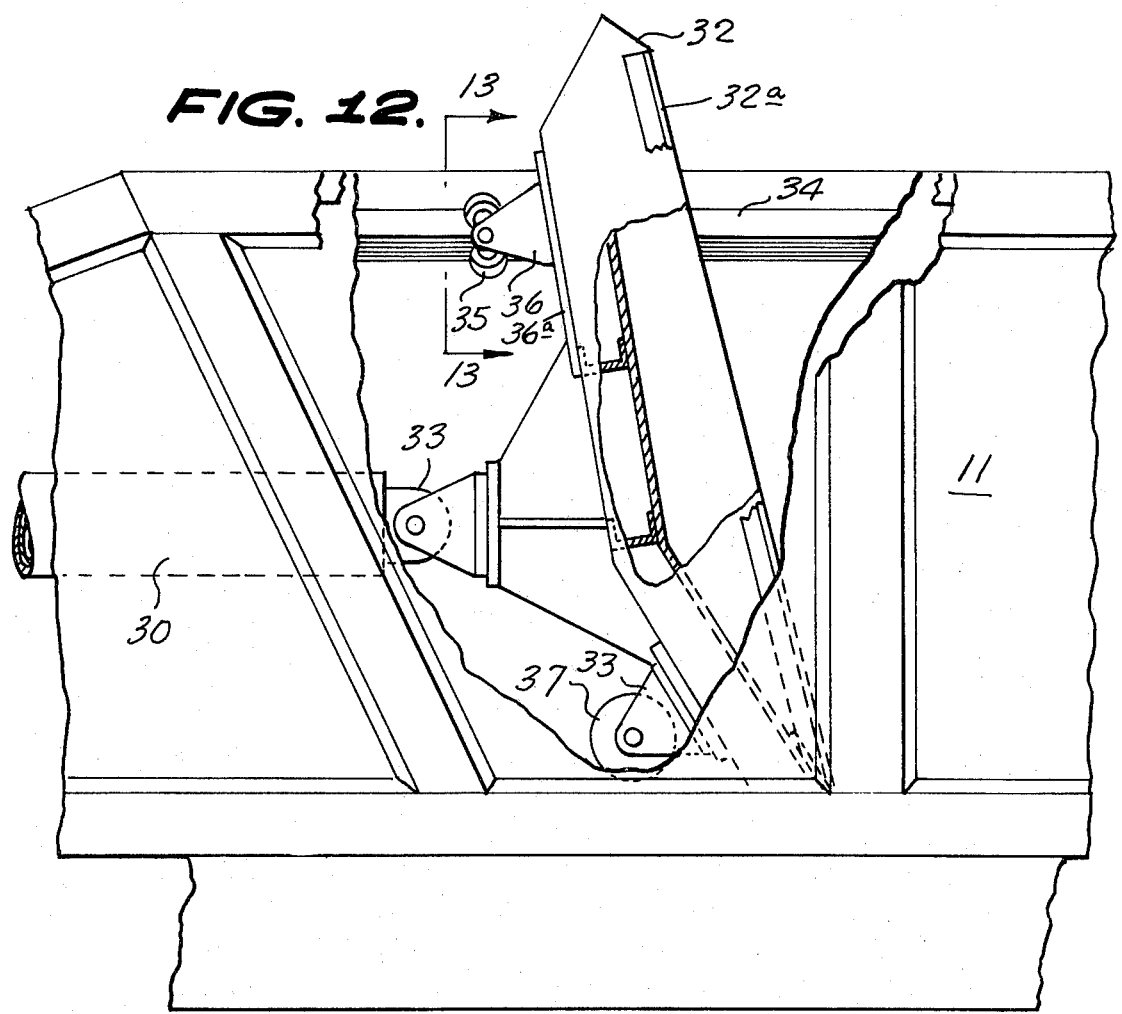
FIG. 12 is a side elevational view, partially broken away, illustrating the details of the mounting of the rejection gate on the trailer.

Referring now to FIGS. 11, 12 and 13, the mounting and support for rejection gate 32 will be more fully described. As shown therein, rejection gate 32, at its bottom portion, rides along the floor of the trailer box by means of roller 37, secured thereto by fitting 38. At its upper end, rejection gate 32 rides on angle irons 34, one such angle iron being welded or otherwise secured to the inner surface of sides 11 of the trailer box. Rollers 35 on either side of angle iron 34 are secured to rejection gate 32 by fitting 36 and plate 36a. Scraping edge 32a is cut out to pass over angle irons 34, as shown in FIG. 11. Rejection gate 32 will thus be guided and held in place by the above-described structure including rollers 35, angle irons 34 and rollers 37.

In summary, the trailer of the present invention may be utilized for highway hauling with the frame in extended position, as shown in FIGS. 1 and 2, and rejection gate 32 retracted, ready for loading. When it is desired to spread or dump the material carried by the trailer, the frame and bogies are moved to the retracted position shown in FIG. 3, so that the space beneath the tailgate 77 is clear. Tailgate locks 68 are then released by a control contained in the cab of the tractor and rejection gate 32 is actuated by a standard hydraulic control through telescoping three-stage cylinder 30. As the rejection gate moves forward, the material will be ejected at a rate dependent upon the speed of travel of the rejection gate and the opening permitted the tailgate by tailgate regulation flow device 80. It should be realized that the trailer in the position shown in FIG. 3, may be used either to dump its entire load contents into a spreader or other receptacle or may itself operate as a spreader by virtue of the control afforded by rejection gate 32 and tailgate regulation device 80. Of course, if it is simply desired to dump the entire contents of the trailer at a single location without regard to the regulation of flow, chains 73 will be loosened completely so that there is no restraint on the opening of tailgate 77.

It will also be remembered that the trailer of the present invention is highly maneuverable by virtue of the fifth wheel connection 48 and the three sectioned extendible steering stringer 41. This enables the trailer to gain access to work areas where conventional trailers and trucks would be of no use.

There has thus been described a new and improved trailer for hauling, spreading and dumping various types of materials, which overcomes the disadvantages of the prior art vehicles of this general type. It will be readily apparent to those skilled in the art that various modifications may be made in the present invention without departing from the spirit and scope thereof, and it is, therefore, intended that the invention be limited only by the claims appended hereto.

I claim:

1. An improved trailer for highway hauling and dumping materials, comprising:
   a. a main load bearing frame member;
   b. a sliding frame member telescopically engageable with said main frame member;
   c. a set of rear bogies;
   d. means connecting said rear bogies to said sliding frame member;
   e. means for locking said sliding frame member with respect to said main frame member in at least two preselected positions;
   f. a load carrying box having side walls, a tailgate and a floor mounted on said main frame member so that the bottom of said tailgate is substantially coincident with the rearmost portion of said main frame member;
   g. hydraulically actuated rejection gate means for rejecting at least a portion of said load out of said box through said tailgate, said tailgate being hinged to the sides of said box and extending downwardly and frontwardly at an acute angle with respect to the vertical; and
   h. tailgate flow regulation means comprising adjustment chain means, spring loaded tension means mounted on said box sides connected to said chain means for imparting tension to said chain means, and means mounted on said tailgate having passage means through which said chain means passes for selectively locking said chain under a desired amount of tension.

2. The trailer set forth in claim 1 wherein said passage means comprises a keyhole.

3. The trailer set forth in claim 1 wherein said spring loaded tension means comprises a tension bolt coaxially disposed with respect to a spring.

* * * * *